United States Patent
Parker et al.

(10) Patent No.: US 10,371,195 B2
(45) Date of Patent: Aug. 6, 2019

(54) SOCKET ASSEMBLY AND METHOD OF MAKING A SOCKET ASSEMBLY

(71) Applicant: Federal-Mogul Motorsports Corporation, Southfield, MI (US)

(72) Inventors: Glen C. Parker, St. Peters, MO (US); Kurt R. Bretz, Albers, IL (US); Brennan Sugg, St. Louis, MO (US); Eric M. Kopsie, Bethalto, IL (US)

(73) Assignee: Federal-Mogul Motorparts LLC, Southfied, MI (US)

( * ) Notice: Subject to any disclaimer, the term of this patent is extended or adjusted under 35 U.S.C. 154(b) by 428 days.

(21) Appl. No.: 15/170,600

(22) Filed: Jun. 1, 2016

(65) Prior Publication Data
US 2017/0350441 A1    Dec. 7, 2017

(51) Int. Cl.
*F16C 11/08* (2006.01)
*F16C 11/06* (2006.01)

(52) U.S. Cl.
CPC .......... *F16C 11/08* (2013.01); *F16C 11/0623* (2013.01); *F16C 11/0652* (2013.01); *F16C 11/0671* (2013.01); *F16C 11/0685* (2013.01); *F16C 11/068* (2013.01); *F16C 2326/05* (2013.01)

(58) Field of Classification Search
CPC ..... Y10T 403/32713; Y10T 403/32721; Y10T 403/32737; Y10T 403/32762; Y10T 403/32786; Y10T 403/32803; Y10T 403/32811; F16C 11/0628; F16C 11/0642;
(Continued)

(56) References Cited

U.S. PATENT DOCUMENTS 2,494,739 A    1/1950  Booth
2,544,583 A    3/1951  Booth
(Continued)

FOREIGN PATENT DOCUMENTS

CN    102478045 A    5/2012
FR      1399174 A    5/1965
KR    100891048 B1    3/2009

OTHER PUBLICATIONS

International Search Report, dated Aug. 28, 2017 (PCT/US2017/035342.

*Primary Examiner* — Amber R Anderson
*Assistant Examiner* — Nahid Amiri
(74) *Attorney, Agent, or Firm* — Robert L. Stearns; Dickinson Wright, PLLC

(57) ABSTRACT

The socket assembly has a housing with an inner bore which extends from a first end to a second end. A ball portion of a ball stud is received in the inner bore. A backing bearing is disposed in the inner bore and presents a curved bearing surface in surface-to-surface contact with the ball portion. A first spring biases the backing bearing against the ball portion. The socket assembly also includes an exit bearing with a cylindrical portion that is in contact with an equator of the ball portion and a semi-spherical portion that is in surface-to-surface contact with an opposite hemisphere from the first bearing surface. A second spring biases the exit bearing into a predetermined location established by the housing. The exit bearing is movable from the predetermined location in a direction towards the second end of the housing against a biasing force of the second spring.

20 Claims, 10 Drawing Sheets

(58) Field of Classification Search
CPC . F16C 11/0666; F16C 11/0671; F16C 11/068; F16C 11/0685; F16C 11/086
USPC ........ 403/132, 133, 135, 138, 141, 143, 144
See application file for complete search history.

(56) References Cited

U.S. PATENT DOCUMENTS

| | | | |
|---|---|---|---|
| 2,618,049 A | | 11/1952 | Flumerfelt |
| 2,635,906 A | * | 4/1953 | Graham ................... B62D 7/16 403/134 |
| 2,861,827 A | | 11/1958 | Langen et al. |
| 2,880,025 A | * | 3/1959 | Herbenar ............ F16C 11/0604 403/133 |
| 3,027,182 A | | 3/1962 | Reuter |
| 3,128,110 A | | 4/1964 | Herbenar |
| 3,343,857 A | | 9/1967 | Cislo |
| 3,376,058 A | | 4/1968 | Herbenar |
| 3,951,557 A | | 4/1976 | Herbenar |
| 4,501,410 A | * | 2/1985 | Weiler .................... B60T 13/57 251/366 |
| 4,790,682 A | * | 12/1988 | Henkel ............... F16C 11/0638 403/135 |
| 5,066,160 A | | 11/1991 | Wood |
| 5,154,530 A | * | 10/1992 | Dresselhouse ........... B62D 7/16 403/138 |
| 5,772,352 A | * | 6/1998 | Fukumoto ................ B60G 3/20 280/124.1 |
| 5,816,731 A | * | 10/1998 | Howard .................... B62D 7/16 403/120 |
| 6,010,271 A | | 1/2000 | Jackson et al. |
| 6,422,779 B1 | | 7/2002 | Spagnuolo |
| 6,533,490 B2 | | 3/2003 | Kincaid et al. |
| 6,695,521 B2 | | 2/2004 | Kincaid et al. |
| 6,764,518 B2 | * | 7/2004 | Godin ....................... A61F 2/04 623/23.68 |
| 7,644,500 B2 | * | 1/2010 | Schmidt ................ B23P 11/005 29/441.1 |
| 8,047,739 B2 | * | 11/2011 | Sellers ................... F16C 11/069 403/122 |
| 8,678,656 B2 | * | 3/2014 | Richter ............... F16C 11/0638 384/213 |
| 8,714,862 B2 | | 5/2014 | Mevorach et al. |
| 9,291,195 B1 | | 3/2016 | Parker et al. |
| 9,765,811 B2 | * | 9/2017 | Karpman ............ F16C 11/0609 |
| 2003/0152420 A1 | | 8/2003 | Broeker |
| 2004/0091306 A1 | * | 5/2004 | Wasylewski ........ F16C 11/0638 403/135 |
| 2007/0163100 A1 | | 7/2007 | Schmidt et al. |
| 2009/0232589 A1 | * | 9/2009 | Kuru ................... F16C 11/0666 403/134 |
| 2013/0121756 A1 | | 5/2013 | Mevorach et al. |
| 2014/0205366 A1 | | 7/2014 | Mevorach et al. |
| 2016/0025129 A1 | * | 1/2016 | Parker .................... F16C 11/06 403/134 |
| 2016/0177998 A1 | * | 6/2016 | Karpman ............ F16C 11/0609 403/135 |

* cited by examiner

SOCKET ASSEMBLY AND METHOD OF MAKING A SOCKET ASSEMBLY

BACKGROUND OF THE INVENTION

1. Field of the Invention

The present invention is related, generally, to socket assemblies, and more particularly, to socket assemblies for vehicle suspension systems.

2. Related Art

Socket assemblies of the type that are used in vehicle suspension systems typically include a ball stud which is rotatable and/or pivotable relative to a housing. Such socket assemblies typically include one or more bearings that are positioned within the housing and are in sliding contact with a ball portion of the ball stud to facilitate the movement of the ball stud relative to the housing. The bearings are typically made of either metal or a hard plastic material.

Such socket assemblies are typically either of the radial loaded type, compression loaded type or the tension-loaded type, depending on the configuration of the suspension system. In many known types of compression-style socket assemblies, when a radial load is applied to the ball stud, the ball stud will try to walk up the radius of the lower bearing, thereby reducing the surface of contact between the ball stud and the lower bearing.

In some applications, two socket assemblies are installed in a single suspension system. For example, FIG. 1 shows an exemplary independent suspension system wherein two socket assemblies are employed to connect a single knuckle with upper and lower control arms. Likewise, FIG. 2 shows an exemplary fixed axle suspension system which also includes two socket assemblies that join a single knuckle with a drive axle case. In each of these cases, the socket assemblies are aligned with one another along an axis. It is important that the socket assemblies be properly aligned within a predetermined tolerance to prevent one of the socket assemblies from carrying a greater share of the load of the vehicle than the other.

SUMMARY OF THE INVENTION AND ADVANTAGES

One aspect of the present invention is for a socket assembly with a housing that has an inner bore. The inner bore extends along an axis from a wall at a generally closed first end to an open second end. The socket assembly also includes a ball stud with a ball portion which is received in the inner bore of the housing and with a shank portion which projects out of the inner bore through the open second end. The socket assembly further includes a backing bearing disposed in the inner bore and presenting a curved first bearing surface in surface-to-surface contact with an outer surface of the ball portion of the ball stud. A first spring is disposed in the inner bore and biases the first bearing surface of the backing bearing against the ball portion of the ball stud. An exit bearing is also disposed in the inner bore of the housing. The exit bearing has a second bearing surface with a cylindrical portion that is in contact with an equator of the ball portion of the ball stud and with a semi-spherical portion that is in surface-to-surface contact with an opposite hemisphere of the ball portion of the ball stud from the first bearing surface of the backing bearing. A second spring is disposed in the inner bore of the housing and biases exit bearing into a predetermined location established by the housing. The exit bearing is movable from the predetermined location in a direction towards the open second end of the housing against a biasing force of the second spring.

The movability of the exit bearing allows it to move axially relative to the housing in a direction away from the backing bearing. This is particularly advantageous in cases where the socket assembly is installed in a vehicle suspension assembly where it is axially aligned with another socket assembly. Specifically, during installation, if the installer fails to properly align the two socket assemblies, the exit bearing may be unseated from the predetermined location and moved axially towards the open second end of the housing which prevents the ball stud from being constrained between the backing and exit bearings. As such, the torque required to rotate the ball stud relative to the housing is not increased as could otherwise be the case if the exit bearing was fixed in its location. As the ball stud, the backing bearing and the exit bearing wear during their operating lives, the second spring biases the exit bearing back into the predetermined location to allow the socket assembly to regain much of its internal clearances.

According to another aspect of the present invention, the exit bearing has an outer surface which is frustum of a cone shaped with a first diameter nearest the open second end of the housing and a second diameter nearest the first closed end of the housing and wherein the first diameter is greater than the second diameter and wherein the outer surface is seated against a tapered inner surface of the housing when the exit bearing is in the predetermined location. The frustum of a cone shape of the outer surface of the exit bearing reduces the forces required to unseat the exit bearing from the predetermined location in the inner bore, thereby improving the improving the socket assembly's performance if misaligned with another socket assembly.

According to yet another aspect of the present invention, the exit bearing is in an interference fit with the housing.

According to still another aspect of the present invention, the exit bearing has an outer surface which presents a plurality of axially extending ridges which are spaced circumferentially from one another.

According to a further aspect of the present invention, a dust boot is sealed against the housing and the ball stud for retaining a lubricant within the inner bore and for keeping contaminants out of the inner bore.

According to yet a further aspect of the present invention, the second spring is at least partially embedded in an elastic body of the dust boot.

According to still a further aspect of the present invention, the first spring is a Belleville washer.

According to another aspect of the present invention, the wall at the closed first end of the housing presents a lubricant opening for receiving a lubricant into the inner bore of the housing.

According to yet another aspect of the present invention, the first bearing surface of the backing bearing presents at least one lubricant channel for conveying the lubricant from the lubricant opening in the housing into a gap between the backing and exit bearings.

According to still another aspect of the present invention, the exit bearing presents at least one lubricant channel.

According to a further aspect of the present invention, the second spring is a Belleville washer.

According to yet a further aspect of the present invention, the housing presents a shoulder which faces towards the open second end of the housing and wherein the exit bearing abuts the shoulder when in the predetermined location.

According to still a further aspect of the present invention, a cover plate is disposed in the inner bore of the housing adjacent the open second end.

According to another aspect of the present invention, the housing at the second open end is bent radially inwardly to trap the cover plate in the inner bore of the housing.

Another aspect of the present invention is for a method of making a socket assembly. The method includes the step of step of preparing a housing with an inner bore which extends along an axis from a wall at a generally closed first end to an open second end. The method continues with the step of inserting a first spring into the inner bore of the housing. The method proceeds with the step of inserting a backing bearing with a first bearing surface into the inner bore of the housing such that the backing bearing is movable in a radial direction relative to the housing within the inner bore. The method continues with the step of inserting a ball portion of a ball stud into the inner bore of the housing such that a shank portion of the ball stud projects out of the inner bore through the open second end and wherein a curved outer surface of the ball portion is in sliding contact with the first bearing surface of the backing bearing. The method proceeds with the step of inserting an exit bearing into the inner bore of the housing such that a cylindrical portion of a second bearing surface is in sliding contact with an equator of the ball portion of the ball stud and such that a semi-spherical portion of the second bearing surface is in sliding contact with an opposite hemisphere of the ball portion of the first bearing surface of the backing bearing. The method continues with the step of inserting a second spring into the inner bore of the housing and biasing the exit bearing towards a predetermined location established by the housing while allowing the exit bearing to move from the predetermined location in a direction towards the open second end of the housing against a biasing force of the second spring.

According to another aspect of the present invention, the method further includes the step of inserting a cover plate into the inner bore of the housing.

According to yet another aspect of the present invention, the method includes the step of deforming the housing adjacent the open second end to trap the cover plate, the first spring, the backing bearing, the ball portion of the ball stud, the exit bearing and the second spring in the inner bore of the housing.

BRIEF DESCRIPTION OF THE DRAWINGS

These and other features and advantages of the present invention will be readily appreciated, as the same becomes better understood by reference to the following detailed description when considered in connection with the accompanying drawings wherein.

DESCRIPTION OF THE ENABLING EMBODIMENT

Figure 1:
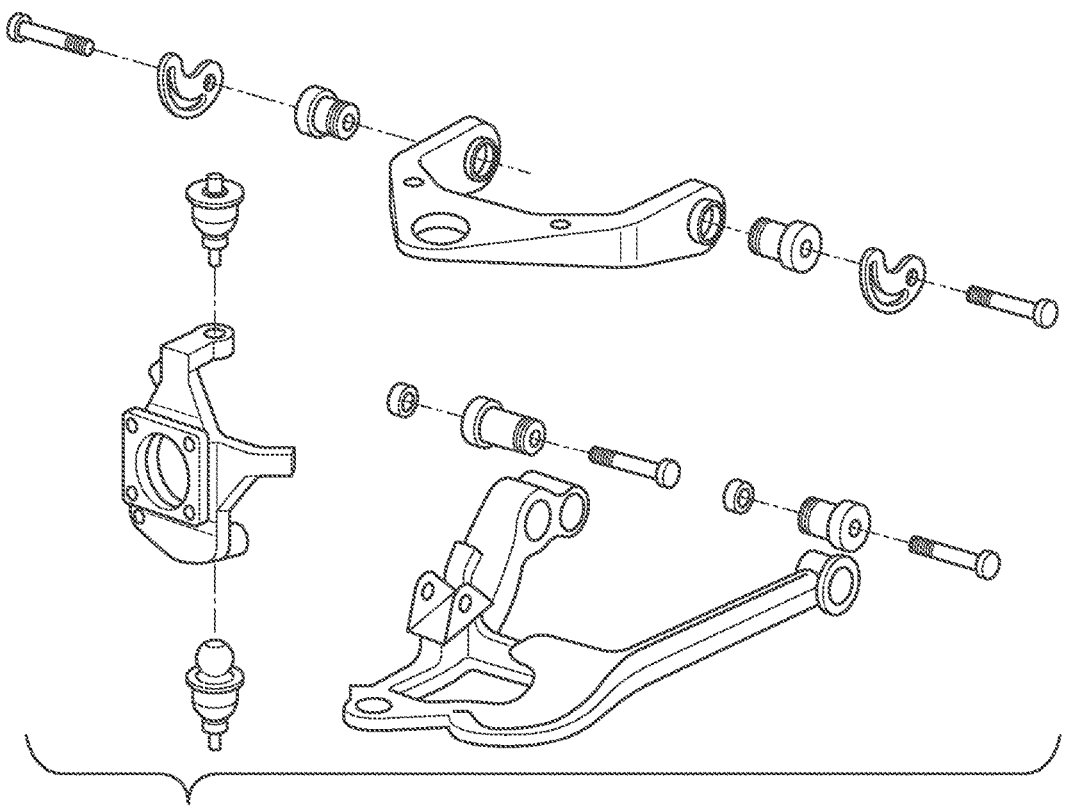
FIG. 1 is an exploded view of a known independent suspension system.
Figure 2:
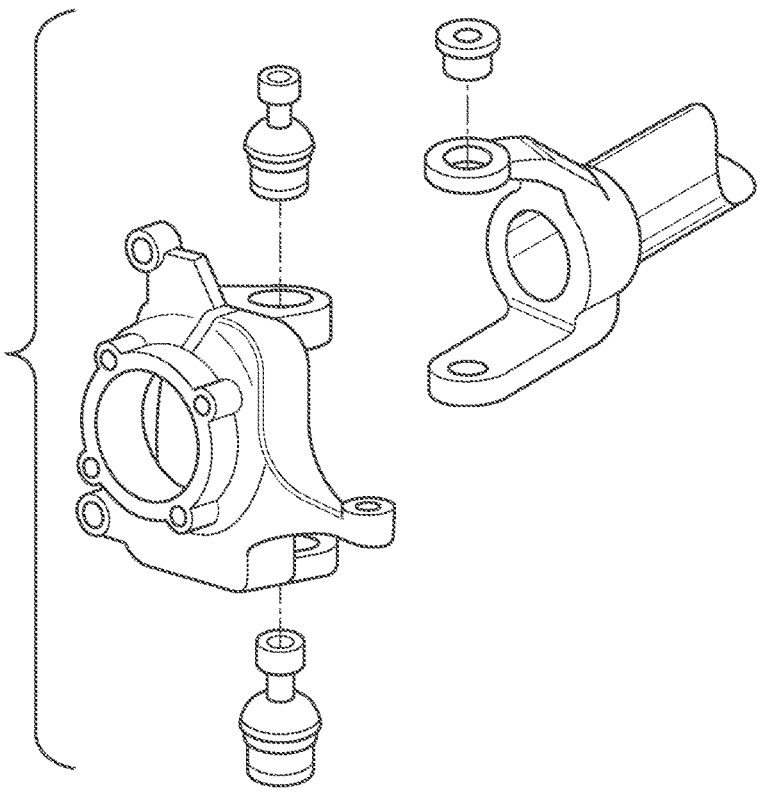
FIG. 2 is an exploded view of a known fixed axle suspension system.
Figure 3:
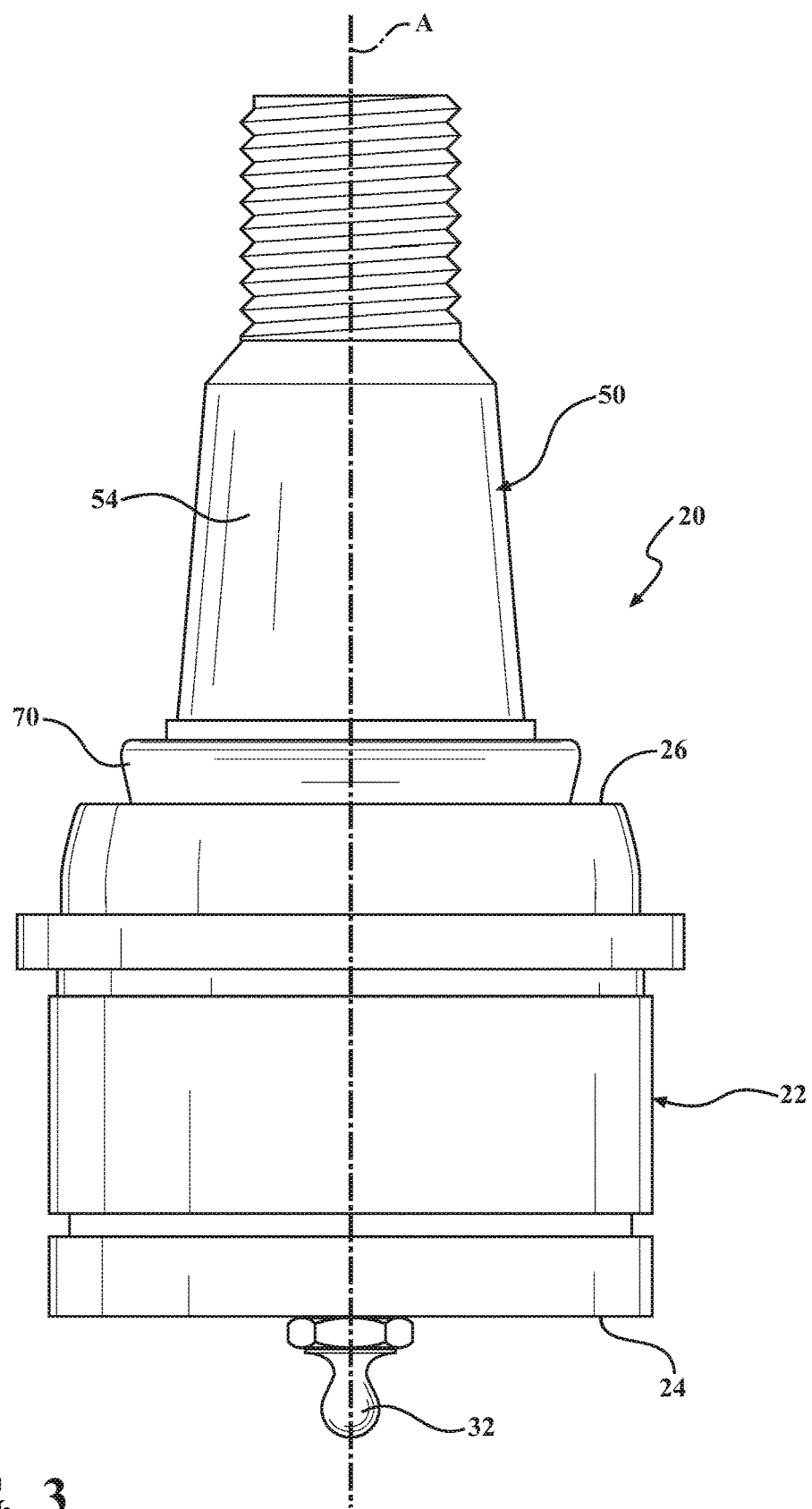
FIG. 3 is a front elevation view of an exemplary embodiment of a socket assembly constructed according to an aspect of the present invention.
Figure 4:
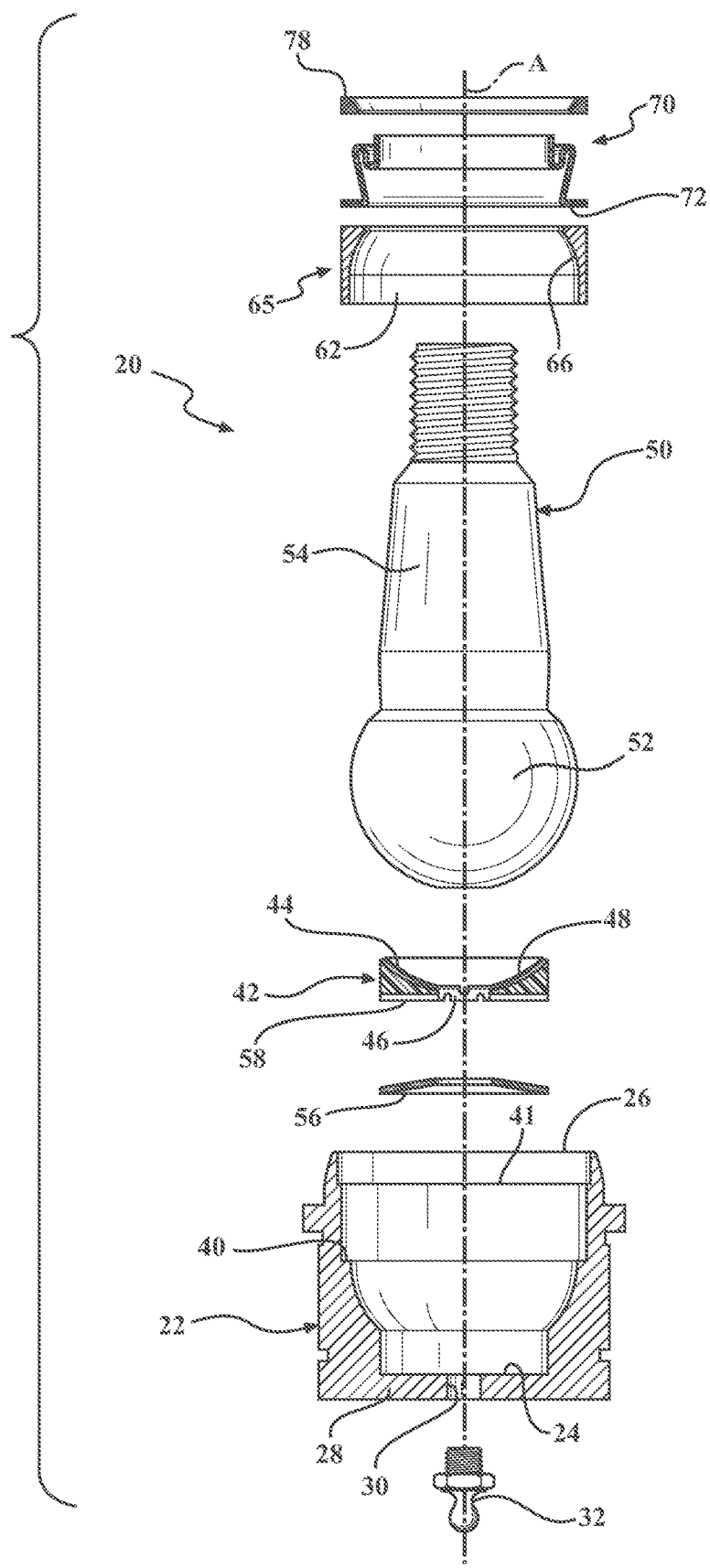
FIG. 4 is an exploded and cross-sectional view of the socket assembly of FIG. 3.

Referring to the Figures, wherein like numerals indicate corresponding parts throughout the several views, a first exemplary embodiment of an improved socket assembly 20 (specifically, a ball joint assembly) is generally shown in FIGS. 3 and 4. In the exemplary embodiment, the socket assembly 20 is configured for joining a control arm (not shown) or axle (not shown) with a knuckle (not shown) of a vehicle suspension assembly. For example, the socket assembly 20 could find uses in either of the types of suspension assemblies shown in FIGS. 1 and 2. However, it should be appreciated that the socket assembly 20 could also find uses in tie rod ends or in a wide range of other automotive and non-automotive applications.

The socket assembly 20 includes a housing 22 with an inner bore that extends along an axis A from a closed first end 24 to an open second end 26. At the closed first end 24, the housing 22 presents a lower wall 28 with a lubricant opening 30 that receives a grease fitting 32 (also known as a zerk fitting) for conveying a lubricant, such as grease, into the inner bore to initially lubricate the components of the socket assembly 20 and to re-lubricate the socket assembly 20 as part of routine maintenance. The housing 22 is preferably made of a metal, such as steel or a steel alloy, and may be shaped through any suitable process or combination of processes including, for example, forging, casting, machining from a billet, etc. In the exemplary embodiment, the housing 22 is a cartridge for press-fitting into an opening in the control arm. However, the housing could alternately be integrally formed with another component, e.g., a control arm or a tie rod end.

Figure 5:
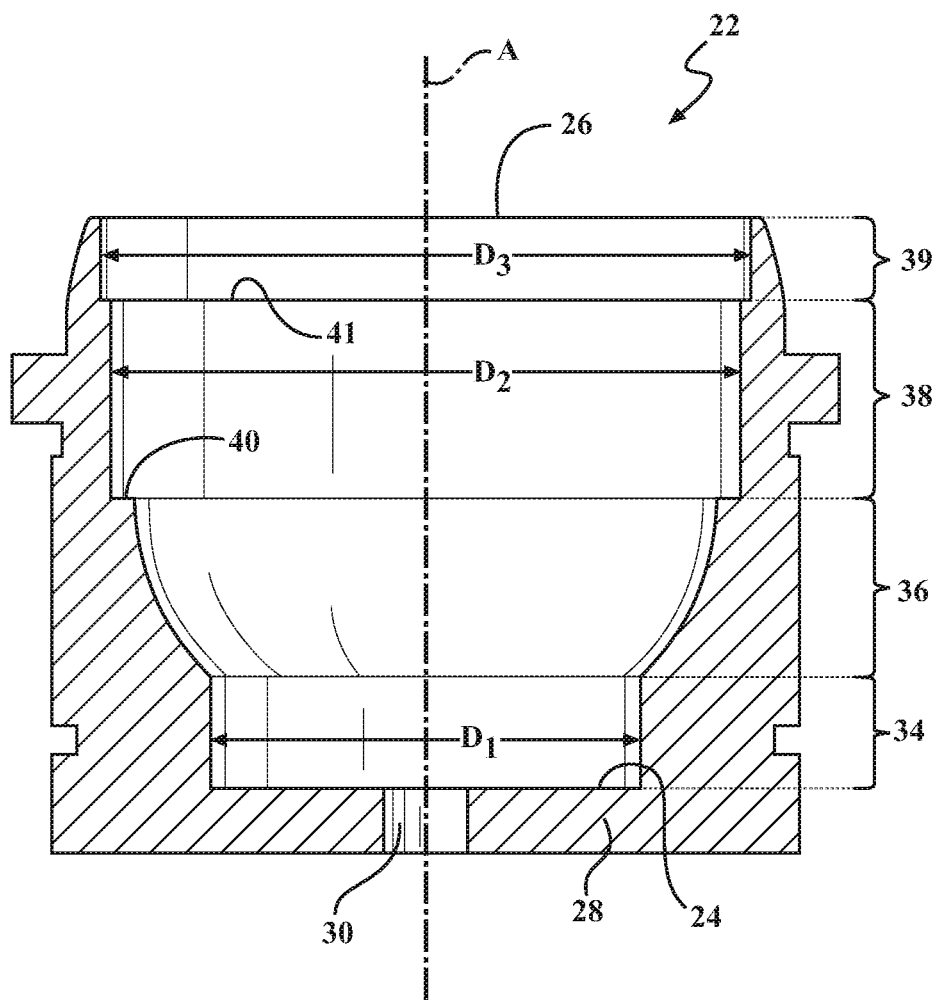
FIG. 5 is a cross-sectional view of a housing of the socket assembly of FIG. 3.

As shown in FIG. 5, the inner bore of the housing 22 has a progressively increasing diameter from the closed first end 24 to the open second end 26. Specifically, the inner bore has a first portion 34 with a generally constant first diameter $D_1$ adjacent the closed first end 24, a second portion 36 with an increasing diameter, a third portion 38 with a generally constant second diameter $D_2$, and a fourth portion 39 with a generally constant third diameter $D_3$ adjacent the open second end 26. As shown, the third diameter $D_3$ of the fourth portion 39 is greater than the second diameter $D_2$ of the third portion 38, and the second diameter $D_2$ of the third portion 38 is greater than the first diameter $D_1$ of the first portion 34. An inner wall of the housing 22 at the second portion 36 of the inner bore is curved to increase the diameter of the second portion 36 in an axial direction towards the open second end 26. Between the second and third portions 36, 38 of the inner bore, the housing 22 presents a first shoulder 40 which faces towards the open second end 26, and the housing 22 presents a second shoulder 41 between the third and fourth portions 38, 39 of the inner bore.

Figure 6:
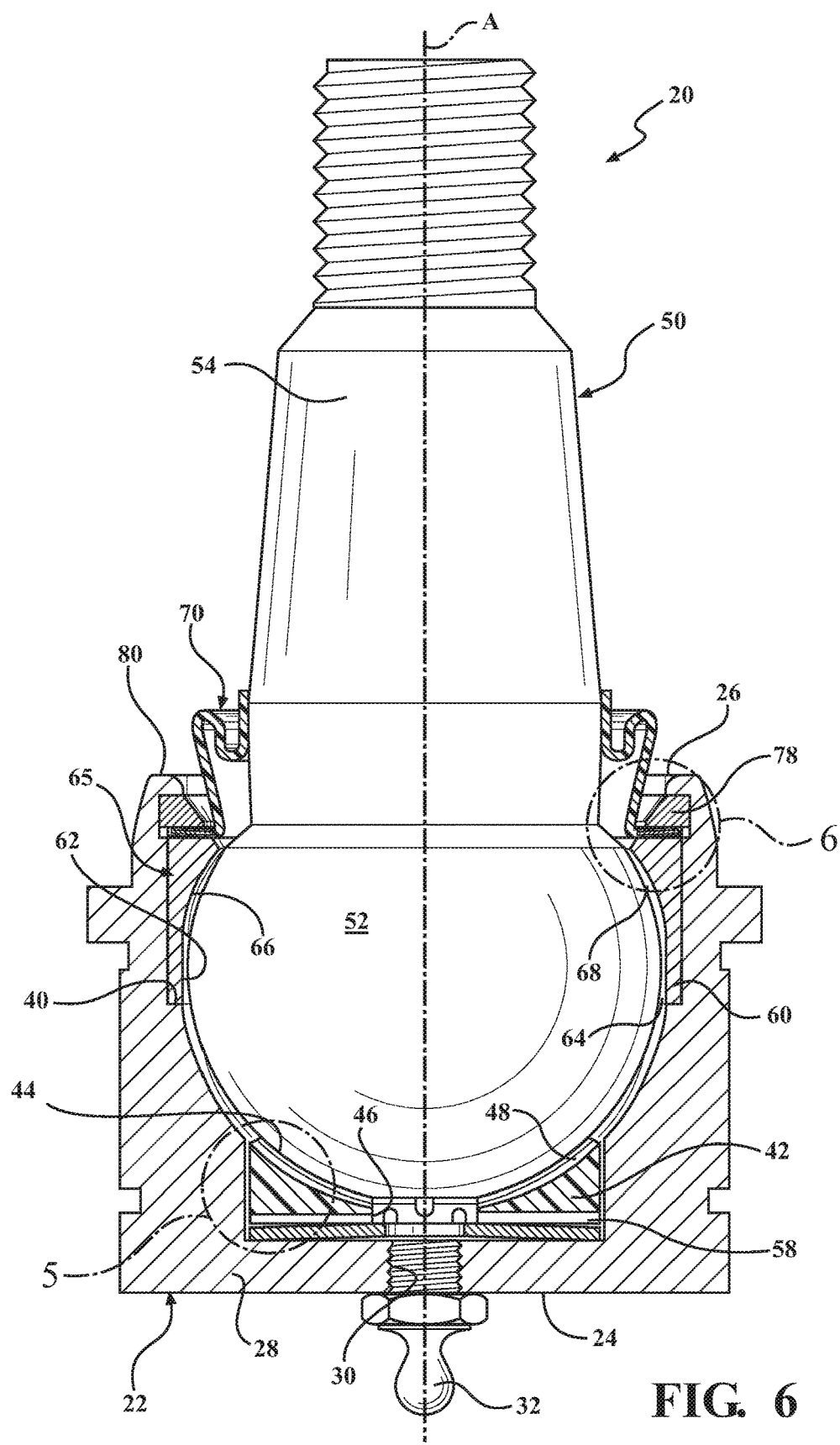
FIG. 6 is a cross-sectional view of the socket assembly of FIG. 3.
Figure 7:
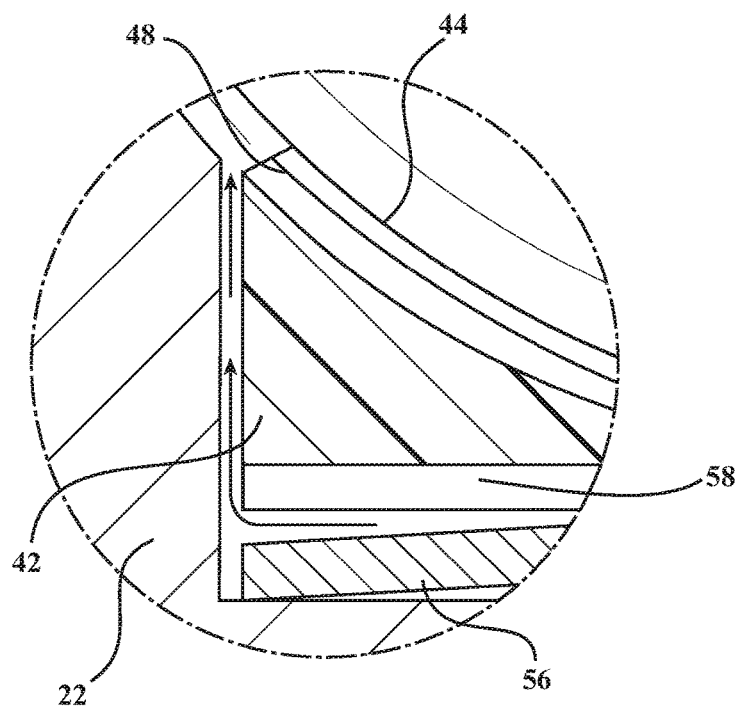
FIG. 7 is an enlarged view of a portion of FIG. 6.
Figure 8:
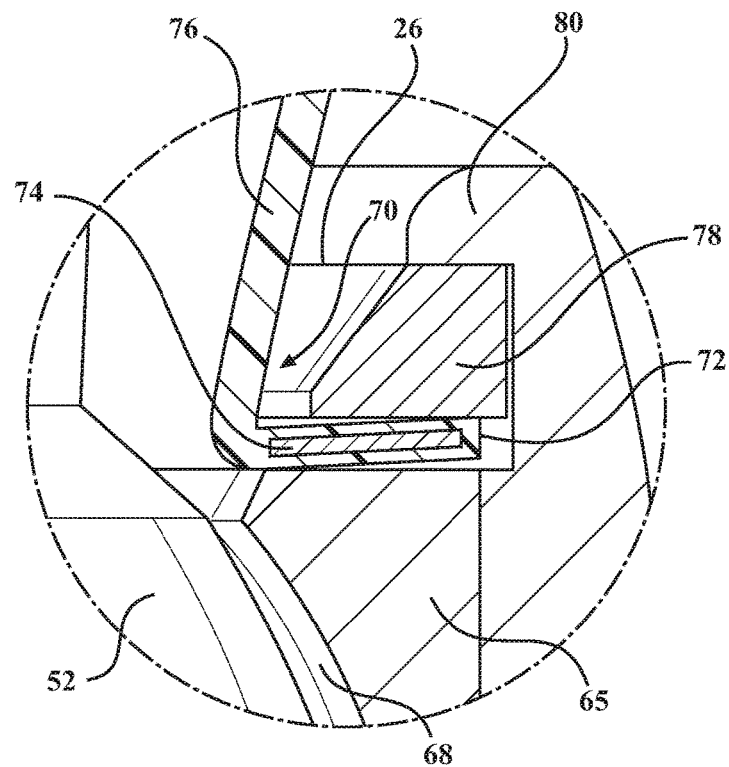
FIG. 8 is another enlarged view of a portion of FIG. 6.
Figure 9:
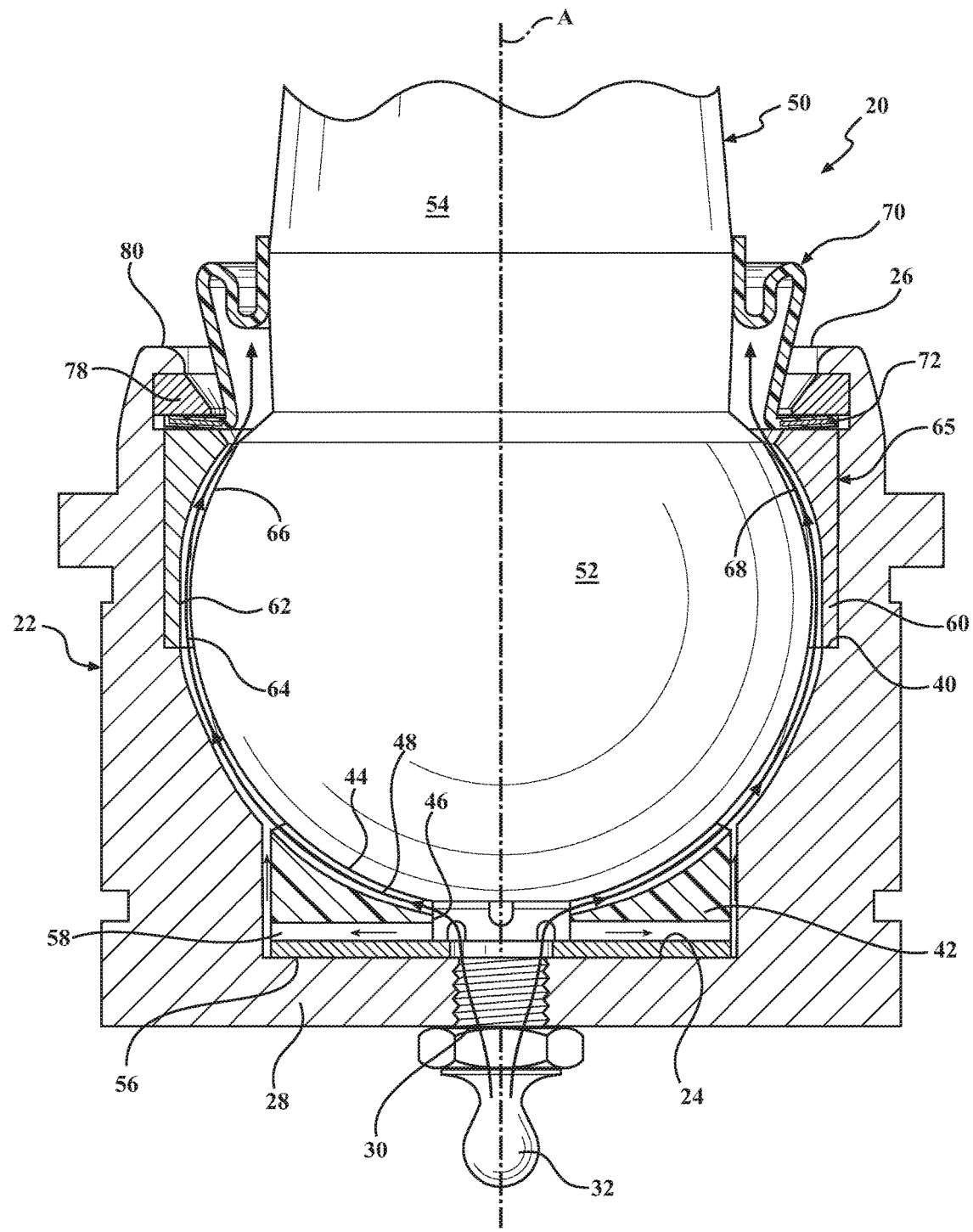
FIG. 9 is a cross-sectional view of the socket assembly of FIG. 3 and illustrating a flow path for grease within an interior of the socket assembly.

Referring now to FIGS. 4-6, a backing bearing 42 is received in the first portion 34 of the inner bore and has a semi-spherically curved first bearing surface 44 which faces axially towards the second open end 26. The backing bearing 42 has an outer surface with an outer diameter which is less than the first diameter $D_1$ of the first portion 34 to present a gap (shown in FIG. 7) between the outer surface of the backing bearing 42 and an inner surface of the housing 22. As such, the backing bearing 42 is allowed to float in a radial direction in the first portion 34 of the inner bore within limits established by the inner surface of the housing 22. The backing bearing 42 also includes a lubricant opening 46 which is aligned with the lubricant opening 30 of the lower wall 28 of the housing 22. The first bearing surface 44 of the exemplary embodiment is provided with a plurality of first grooves 48 formed thereon for distributing a lubricant from the lubricant opening 46 into the second portion 36 of the inner bore. As shown in FIG. 7, a lower surface of the backing bearing 42 presents a plurality of lubrication channels 58 that allow the lubricant to flow into the gap between the backing bearing 42 and the first portion 34 of the inner bore of the housing 22 from which the lubricant is able to enter the second portion 36 of the inner bore.

The socket assembly 20 further includes a ball stud 50 which is partially received in the inner bore of the housing 22. Specifically, the ball stud 50 includes a ball portion 52 that is fully disposed in the inner bore and a shank portion 54 which projects out of the inner bore through the open second end 26. The shank portion 54 extends from the ball portion 52 to a distal end which is threaded for receiving a nut to connect the shank portion 54 with another component, e.g., a knuckle. The ball portion 52 of the ball stud 50 has a generally semi-spherically curved outer surface which has a similar radius of curvature to the first bearing surface 44 of the backing bearing 42. The outer surface of the ball portion 52 is in sliding contact with the first bearing surface 44 to allow the ball stud 50 to rotate and pivot relative to the backing bearing 42 and the housing 22 during operation of the suspension assembly. The backing bearing 42 is preferably made of metal, such as steel or a steel alloy.

A first spring in the form of a Belleville washer 65 is positioned in the first portion 34 of the inner bore between the backing bearing 42 and the lower wall 28 of the housing 22 for biasing the first bearing surface 44 of the backing bearing 42 against the outer surface of the ball portion 52 of the ball stud 50.

The socket assembly 20 further includes an exit bearing 65 which is positioned in the third portion 38 of the inner bore and abuts the first shoulder 40 of the housing 22. The exit bearing 65 is a separate piece from the backing bearing 42 and is spaced axially therefrom by a gap in the second portion 36 of the inner bore. The exit bearing 65 has a second bearing surface with a cylindrical portion 62 and a semi-spherical portion 66. The cylindrical portion 62 is in sliding contact with an equator or centerline of the ball portion 52 of the ball stud 50. The semi-spherical portion 66 has a radius of curvature that is similar to that of an outer surface of the ball portion 52 of the ball stud 50 and is in sliding contact with an opposite hemisphere of the ball portion 52 from the first bearing surface 44 of the backing bearing 42. In the exemplary embodiment, the second bearing surface 62 is provided with a plurality of second lubrication grooves 64 for distributing lubricant around the surface-to-surface contact area between the second bearing surface and the outer surface of the ball portion 52 of the ball stud 50 and for conveying the lubricant in the inner bore axially across the exit bearing 65. In the second portion 36 of the inner bore, the gap between the backing bearing 42 and the exit bearing 65 acts as a lubrication reservoir, which holds the lubricant.

The exit bearing 65 has a generally flat or planar top surface 87 which faces towards the open second end 26 of the inner bore and a generally flat or planar lower surface 82 that faces towards the closed first end 24 of the inner bore. When the exit bearing 65 is positioned in a predetermined seating location in the inner bore of the housing 22, the flat lower surface 82 abuts the first shoulder 40 of the housing 22.

During operation of the suspension assembly, the cylindrical portion 62 of the second bearing surface transfers all or substantially all of the radial forces between the ball stud 50 and the housing 22 while the backing bearing 42 and the semi-spherical portion 66 of the second bearing surface transfer all or substantially all of the axial forces between the ball stud 50 and the housing 22.

The socket assembly 20 further includes a dust boot 70 which is sealed against the housing 22 and against the shank portion 54 of the ball stud 50 for maintaining the lubricant in the inner bore of the housing 22 and for keeping contaminants outside of the inner bore. The dust boot 70 includes a first boot end which presents a radially outwardly extending flange 72 with a second spring in the form of a Belleville washer 74 that is embedded within a boot body 76 at the radially outwardly extending flange 72. The boot body 76 is made of an elastic and flexible sealing material, such as rubber or a plastic material. The radially outwardly extending flange 72 of the dust boot 70 is positioned in the fourth portion 39 of the inner bore of the housing 22 and is in surface-to-surface contact with the top surface 87 of the exit bearing 65.

A cover plate 78 is positioned at an opposite side of the radially outwardly extending flange 72 of the dust boot 70. The housing 22 has a radially inwardly extending lip 80 which traps the cover plate 78 and the radially outwardly extending flange 72 of the dust boot 70 between the radially inwardly extending lip 80 and the exit bearing 65. This also has the effect of preloading the Belleville washer 74 in the dust boot 70 to impart a preload force against the exit bearing 65 to bias the second bearing surface of the exit bearing 65 against the outer surface of the ball portion 52 of the ball stud 50. The radially inwardly extending lip 80 is preferably formed into the housing 22 by swaging, or spinning, the housing 22 at the open second end 26.

Figure 10:
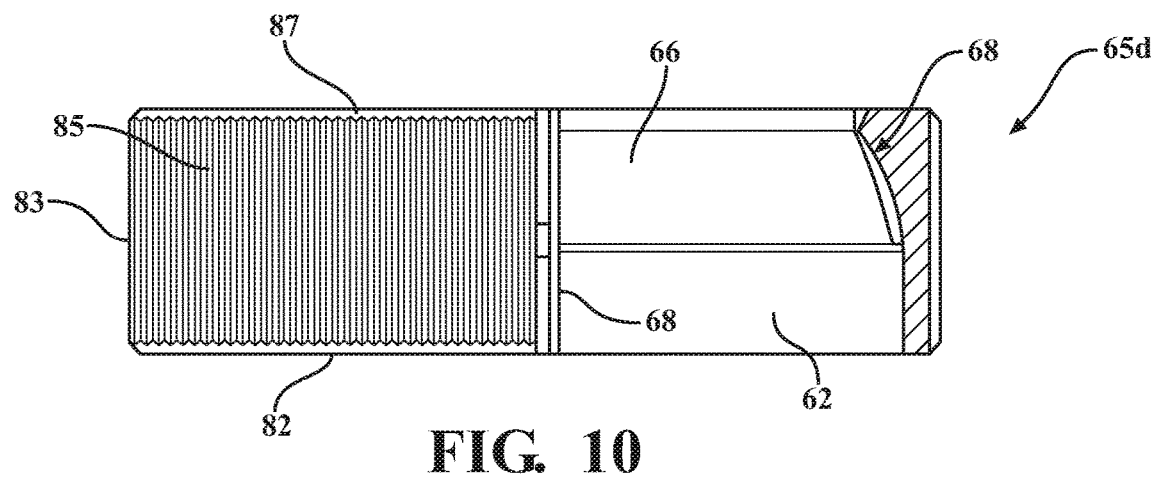
FIG. 10 is a front and semi-sectional view of an exit bearing of the socket assembly of FIG. 3.

As shown in FIG. 10, in the first exemplary embodiment of the socket assembly 20, the exit bearing 65 has an outer surface 83 that is generally cylindrical in shape and includes a plurality of axially extending and circumferentially spaced ridges 85, or knurls, distributed around the outer surface 83. As shown, the ridges 85 extend axially from the planar top surface 87 of the exit bearing 65 to the planar lower surface 82. The ridges 85 prevent rotation of the exit bearing 65 within the inner bore and relative to the housing 22.

Figure 11:
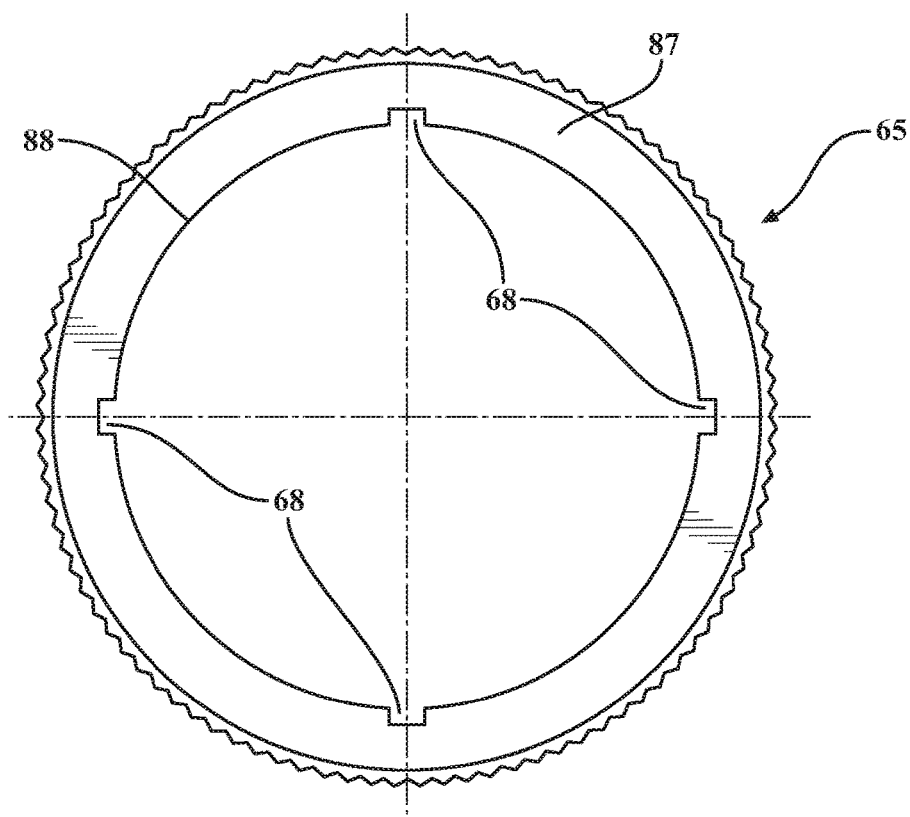
FIG. 11 is a top elevation view of the exit bearing of FIG. 10.

As shown in FIG. 11, as viewed from above, an opening 88 in the planar top surface 87 of this embodiment of the exit bearing 65 is generally circular in shape to allow the ball stud 50 to rotate relative to the housing 22 by a substantially equal amount in all rotational directions.

Figure 12:
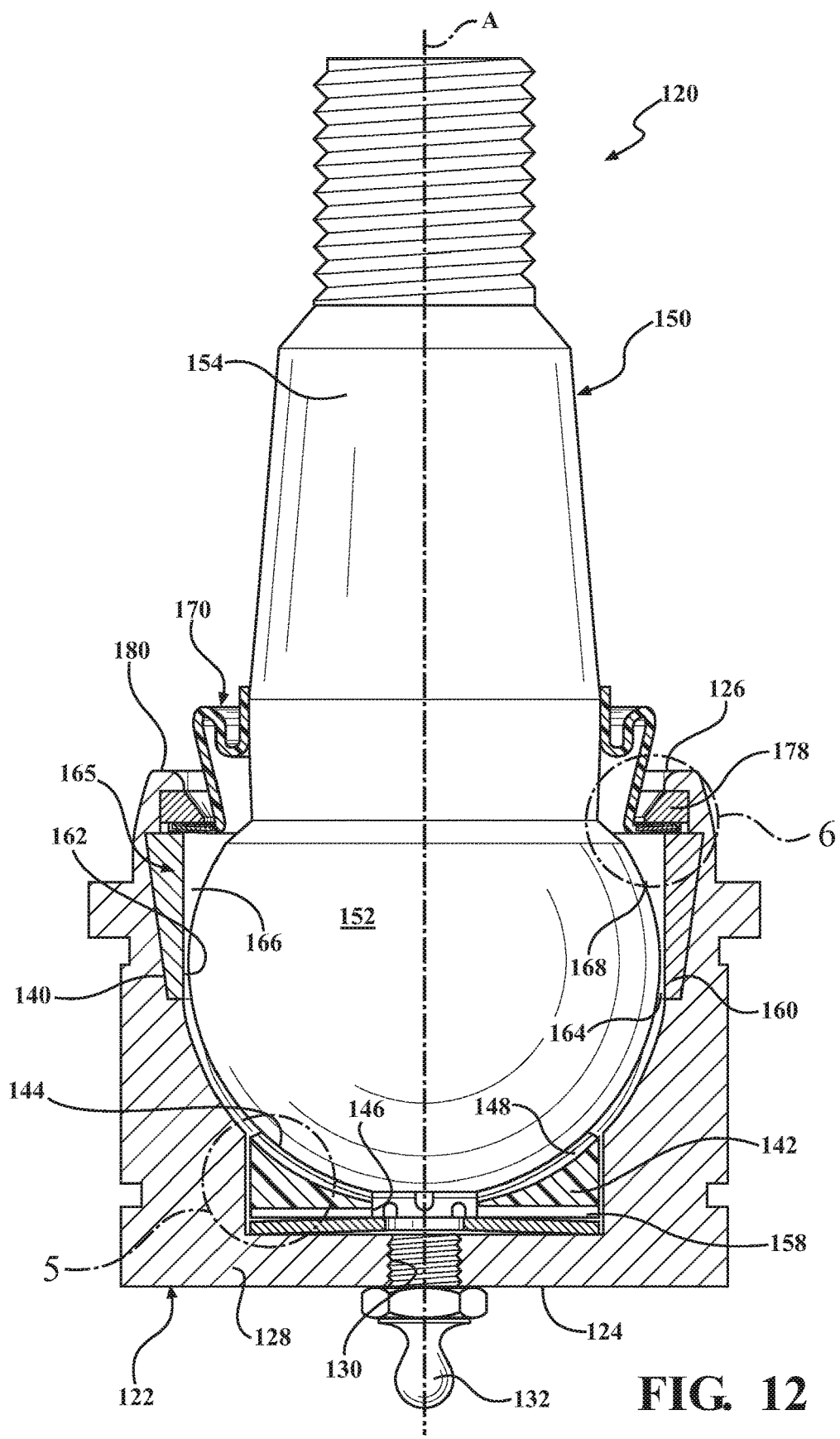
FIG. 12 is a cross-sectional view of an alternate embodiment of the socket assembly.
Figure 13:
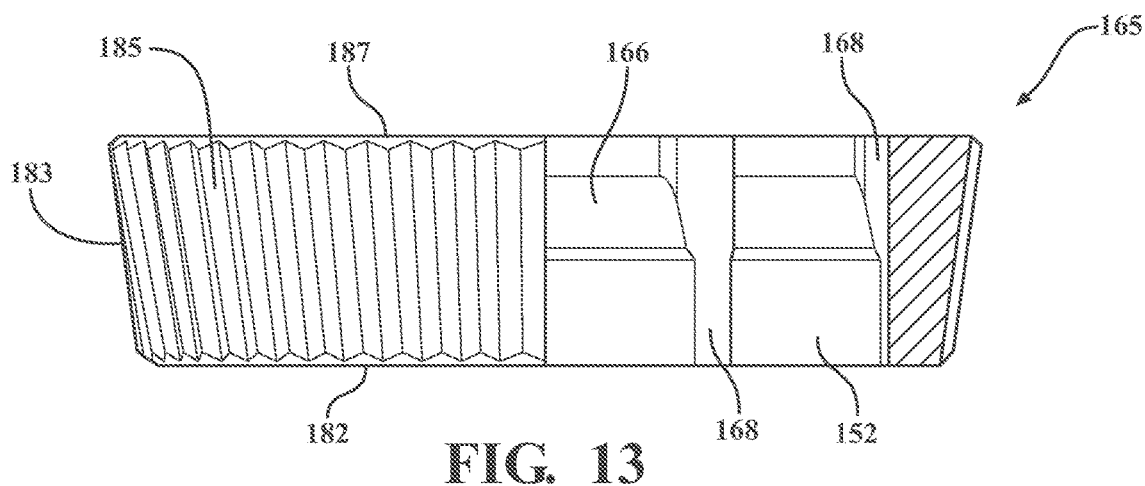
FIG. 13 is a semi-sectional view of an exit bearing of the socket assembly of FIG. 12.
Figure 14:
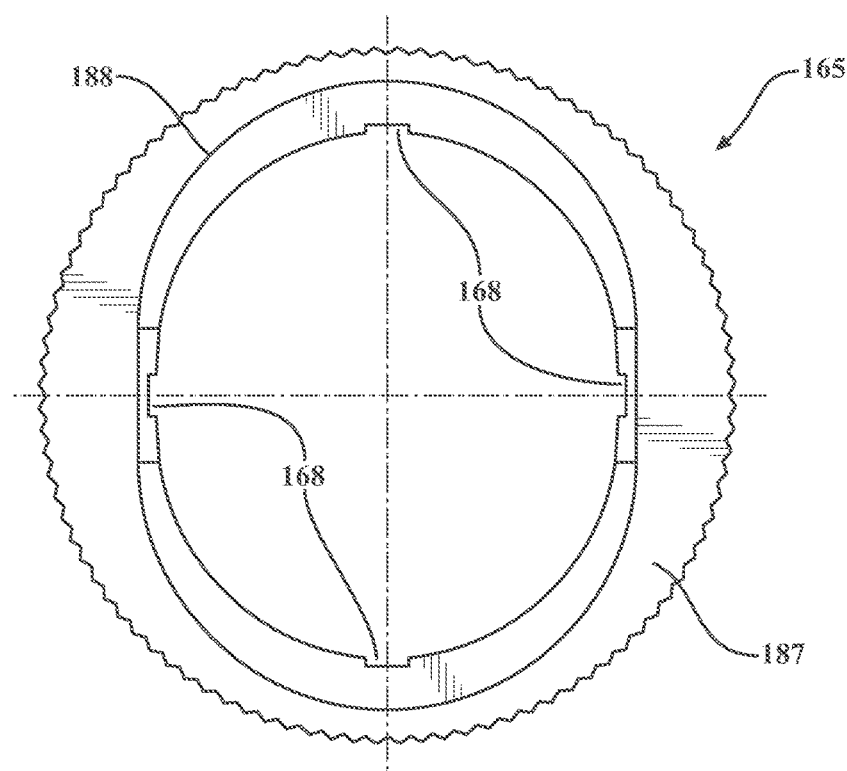
FIG. 14 is a top elevation view of the exit bearing of FIG. 13.

Referring now to FIG. 12, a second exemplary embodiment of the socket assembly 120 is generally shown with like numerals, separated by a prefix of "1" indicating corresponding parts with the first exemplary embodiment described above. This exemplary embodiment is distinguished from the first exemplary embodiment discussed above in that the outer surface 183 of the exit bearing 165 has a frustum of a cone shape and is in contact with a tapered surface of the housing 22 to establish the predetermined seating location for the exit bearing 165 within the inner bore of the housing 122. Specifically, the outer surface 183 of the exit bearing 165 has a first diameter nearest the open second end 126 of the housing 122 and a smaller second diameter nearest the closed first end 124 of the housing 122. The frustum of a cone shape of the exit bearing 165 reduces the forces required to dislodge the exit bearing 165 from the predetermined seating location within the inner bore of the housing 122. Referring now to FIG. 14, the exit bearing 165 of the second exemplary embodiment is also distinguished from that of the first exemplary embodiment by the opening 188 in the top surface 187 being generally elliptical, for oval, in shape. The elliptical or oval shaped opening 188 allows the ball stud 150 (shown in FIG. 12) to rotate by a greater magnitude relative to the housing 122 (also shown in FIG. 12) in one rotational direction than in another. That is, the shape of the opening 188 constrains, or limits, the rotation of the ball stud 150 in one rotational direction as compared to another rotational direction.

Another aspect of the present invention is a method of making a socket assembly 20, such as the exemplary socket assembly shown in FIGS. 3-8. The method includes the step of preparing a housing 22 with an inner bore which extends from a wall 28 at a lower end 24 to an open second end 26. The method proceeds with the step of inserting a first spring 56 into the inner bore of the housing 22. The method continues with the step of inserting a backing bearing 42 into the inner bore of the housing 22 such that the backing bearing 42 is movable in a radial direction relative to the housing 22 within the inner bore. The method proceeds with the step of inserting a ball portion 52 of a ball stud 50 into the inner bore of the housing 22 such that a shank portion 54 projects out of the inner bore through the open second end 26 and wherein a curved outer surface of the ball portion 52 is in sliding contact with a first bearing surface 44 of the backing bearing 42. The method continues with the step of inserting an exit bearing 65 into the inner bore of the housing 22 such that a cylindrical portion 62 of a second bearing surface of the exit bearing 65 is in sliding contact with an equator, or centerline, of the ball portion 52 of the ball stud 50 and such that a semi-spherical portion 66 of the second bearing surface is in sliding contact with an opposite hemisphere of the ball portion 52 from the first bearing surface 44 of the backing bearing 42. The method proceeds with the step of inserting a second spring 74 into the inner bore of the housing 22 and biasing the exit bearing 65 towards a predetermined location established by the housing 22 while allowing the exit bearing 65 to move from the predetermined location in a direction towards the open second end 26 of the housing 22 against a biasing force of the second spring 74. The method may also include the steps of inserting a cover plate 78 into the inner bore of the housing 22 and deforming (such as through swaging) the housing 22 adjacent the open second end 26 to trap the cover plate 78, first spring 56, backing bearing 42, ball portion 52 of the ball stud 50, exit bearing 65 and second spring 74 in the inner bore of the housing 22.

It should be appreciated that the use of the terms "upper" and "lower" herein is in reference to the orientation of the socket assembly 20 in the Figures and is not to be interpreted as requiring a particular orientation or in any way be limiting.

Obviously, many modifications and variations of the present invention are possible in light of the above teachings and may be practiced otherwise than as specifically described while within the scope of the appended claims.

What is claimed is:

1. A socket assembly, comprising:
a housing with an inner bore that extends along an axis from a wall at a generally closed first end to an open second end;
a ball stud having a ball portion which is received in said inner bore of said housing and having a shank portion which projects out of said inner bore through said open second end;
a backing bearing disposed in said inner bore and presenting a curved first bearing surface in surface-to-surface contact with an outer surface of said ball portion of said ball stud;
a first spring disposed in said inner bore and biasing said first bearing surface of said backing bearing against said ball portion of said ball stud;
an exit bearing disposed in said inner bore of said housing and presenting a second bearing surface with a cylindrical portion in contact with an equator of said ball portion of said ball stud and with a semi-spherical portion in surface-to-surface contact with an opposite hemisphere of said ball portion of said ball stud from said first bearing surface of said backing bearing, said cylindrical portion having a constant diameter and extending axially past said equator of said ball portion of said ball stud;
a second spring biasing said exit bearing into a predetermined location established by said housing; and
said exit bearing being movable from said predetermined location in a direction towards said open second end of said housing against a biasing force of said second spring.

2. The socket assembly as set forth in claim 1 wherein said exit bearing has an outer surface that is frustum of a cone shaped with a first diameter nearest said open second end of said housing and a second diameter nearest said first closed end of said housing and wherein said first diameter is greater than said second diameter and wherein said outer surface is seated against a tapered inner surface of said housing when said exit bearing is in said predetermined location.

3. The socket assembly as set forth in claim 1 wherein said exit bearing is in an interference fit connection with said housing.

4. The socket assembly as set forth in claim 3 wherein said exit bearing has an outer surface which presents a plurality of axially extending ridges that are spaced circumferentially from one another.

5. The socket assembly as set forth in claim 3 further including a dust boot sealed with said housing and sealed with said ball stud for retaining a lubricant within said inner bore of said housing and for keeping contaminants out of said inner bore of said housing.

6. The socket assembly as set forth in claim 5 wherein said second spring is at least partially embedded in an elastic body of said dust boot.

7. The socket assembly as set forth in claim 1 wherein said first spring is a Belleville washer.

8. The socket assembly as set forth in claim 1 wherein said wall at said closed first end of said housing presents a lubricant opening for receiving a lubricant into said inner bore of said housing.

9. The socket assembly as set forth in claim 8 wherein said first bearing surface of said backing bearing presents at least one lubricant channel for conveying the lubricant from said lubricant opening in said housing into a gap between said backing and exit bearings.

10. The socket assembly as set forth in claim 9 wherein said second bearing surface of said exit bearing presents at least one lubricant channel.

11. The socket assembly as set forth in claim 1 wherein said second spring is a Belleville washer.

12. The socket assembly as set forth in claim 1 wherein said housing presents a shoulder which faces towards said open second end of said housing and wherein said exit bearing abuts said shoulder when in said predetermined location.

13. The socket assembly as set forth in claim 1 further including a cover plate disposed in said inner bore of said housing adjacent said open second end.

14. The socket assembly as set forth in claim 13 wherein said housing at said second open end is bent inwardly to trap said cover plate in said inner bore of said housing.

15. A method of making a socket assembly, comprising the steps of:
preparing a housing with an inner bore which extends along an axis from a wall at a generally closed first end to an open second end;
inserting a first spring into the inner bore of the housing;
inserting a backing bearing with a first bearing surface into the inner bore of the housing such that the backing bearing is movable in a radial direction relative to the housing within the inner bore;
inserting a ball portion of a ball stud into the inner bore of the housing such that a shank portion of the ball stud projects out of the inner bore though the open second end and wherein a curved outer surface of the ball portion is in sliding contact with the first bearing surface of the backing bearing;
preparing an exit bearing which has a second bearing surface with a cylindrical portion and a semi-spherical portion, the cylindrical portion having a constant diameter that extends in an axial direction;
inserting the exit bearing into the inner bore of the housing such that the cylindrical portion of the second bearing surface of the exit bearing is in sliding contact with and extends axially past an equator of the ball portion of the ball stud and such that the semi-spherical portion of the second bearing surface is in sliding contact with an opposite hemisphere of the ball portion from the first bearing surface of the backing bearing; and
inserting a second spring into the inner bore of the housing and biasing the exit bearing towards a predetermined location established by the housing while allowing the exit bearing to move from the predetermined location in a direction towards the open second end of the housing against a biasing force of the second spring.

16. The method as set forth in claim 15 further including the step of inserting a cover plate into the inner bore of the housing.

17. The method as set forth in claim 16 further including the step of deforming the housing adjacent the open second end to trap the cover plate, the first spring, the backing bearing, the ball portion of the ball stud, the exit bearing and the second spring in the inner bore of the housing.

18. The method as set forth in claim 16 wherein the second spring is a Belleville washer.

19. The method as set forth in claim 18 wherein the second spring is at least partially embedded within an elastic body of a dust boot.

20. The method as set forth in claim 15 wherein the first spring is a Belleville washer.

\* \* \* \* \*